(12) United States Patent
Togashi et al.

(10) Patent No.: US 7,948,737 B2
(45) Date of Patent: May 24, 2011

(54) MULTILAYER CAPACITOR ARRAY

(75) Inventors: Masaaki Togashi, Tokyo (JP); Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 408 days.

(21) Appl. No.: 12/274,790

(22) Filed: Nov. 20, 2008

(65) Prior Publication Data

US 2009/0147439 A1 Jun. 11, 2009

(30) Foreign Application Priority Data

Dec. 11, 2007 (JP) ................................. 2007-319913

(51) Int. Cl.
*H01G 4/228* (2006.01)
(52) U.S. Cl. .................. 361/306.3; 361/306.1; 361/303; 361/308.1; 361/321.2; 361/313
(58) Field of Classification Search ............... 361/306.3, 361/306.1, 303–305, 301.2, 301.4, 311–313, 361/308.1, 309, 321.1, 321.2
See application file for complete search history.

(56) References Cited

U.S. PATENT DOCUMENTS

| | | | | |
|---|---|---|---|---|
| 6,072,687 A * | 6/2000 | Naito et al. | ................... | 361/303 |
| 6,191,932 B1 * | 2/2001 | Kuroda et al. | ................ | 361/303 |
| 6,282,079 B1 * | 8/2001 | Nagakari et al. | ............. | 361/303 |
| 6,657,848 B2 * | 12/2003 | Togashi et al. | ............. | 361/306.3 |
| 6,765,781 B2 | 7/2004 | Togashi | | |
| 7,145,429 B1 | 12/2006 | Togashi et al. | | |
| 7,420,796 B2 * | 9/2008 | Ota | ........................... | 361/321.2 |
| 7,679,882 B2 * | 3/2010 | Lee et al. | ................... | 361/306.3 |
| 7,715,172 B2 * | 5/2010 | Kawasaki et al. | ............. | 361/303 |

FOREIGN PATENT DOCUMENTS

| | | |
|---|---|---|
| JP | A-11-26291 | 1/1999 |
| JP | A-2003-168621 | 6/2003 |
| JP | A-2007-201467 | 8/2007 |
| KR | 10-2007-0078397 | 7/2007 |

* cited by examiner

*Primary Examiner* — Nguyen T Ha
(74) *Attorney, Agent, or Firm* — Oliff & Berridge, PLC

(57) ABSTRACT

At least one of a plurality of first internal electrodes and a second internal electrode are arranged as opposed with at least one of the dielectric layers in between. Third and fourth internal electrodes are arranged as opposed with at least one of the dielectric layers in between. The first internal electrodes are electrically connected to a first external connecting conductor through lead conductors. The second, third, and fourth internal electrodes are electrically connected to second, third, and fourth terminal conductors, respectively, through lead conductors. At last one but not all of the first internal electrodes are electrically connected to the first terminal conductor through a lead conductor.

11 Claims, 6 Drawing Sheets

MULTILAYER CAPACITOR ARRAY

BACKGROUND OF THE INVENTION

1. Field of the Invention

The present invention relates to multilayer capacitor arrays.

2. Related Background Art

As the size and thickness of electronic devices are reduced, integration of capacitors to be mounted in such electronic devices is required. Therefore, in recent years, capacitor arrays including a plurality of capacitors in a single chip have been developed. For example, a known multilayer capacitor array includes a laminated body formed of alternately laminated internal electrode layers, each having internal electrodes arranged parallel to each other, and dielectric layers, and terminal conductors formed on the laminated body (for example, refer to Japanese Unexamined Patent Application Publication No. Hei 11-26291).

While a reduction in the power-supply voltage for a central processing unit (CPU) mounted in a digital electronic device has been achieved, the load current has increased. Because it is very difficult to keep variations in the power-supply voltage, caused by abrupt changes in the load current, within an allowable range, a multilayer capacitor serving as a decoupling capacitor is connected to the power supply. During transient variations in the load current, the multilayer capacitor supplies an electric current to the CPU to control variations in the power-supply voltage.

SUMMARY OF THE INVENTION

Recently, as the operating frequency of CPUs these days increases, the load current is becoming faster and greater. Therefore, there are demands for increasing the capacitance and equivalent series resistance (ESR) of the multilayer capacitors used as decoupling capacitors.

However, Japanese Unexamined Patent Application Publication No. Hei 11-26291 does not mention the ESR of the multilayer capacitor array.

The present invention has been made to solve the above-described problem, and an object thereof is to provide a multilayer capacitor array having controllable ESR.

In a typical multilayer capacitor array, all internal electrodes are connected to respective terminal conductors through lead conductors. Therefore, the lead conductors to be connected to the terminal conductors are provided in the same number as the internal electrodes, making the ESR small. If the number of the laminated dielectric layers and internal electrode layers is increased in order to enhance the capacitance of the multilayer capacitor array, the number of lead conductors also increases. Because resistance components of the lead conductors to be connected to the terminal conductors are connected in parallel to the terminal conductors, the ESR of the multilayer capacitor array further decreases as the number of the lead conductors to be connected to the terminal conductors increases. For example, in the multilayer capacitor array disclosed in Japanese Unexamined Patent Application Publication No. Hei 11-26291, because all the internal electrodes are directly connected to the terminal conductors, the ESR decreases with an increase in electrostatic capacitance associated with an increase in the number of laminated layers to meet a trend toward higher capacitance. The demands for higher capacitance and greater ESR of multilayer capacitor arrays are in conflict with each other.

The present inventors carried out extensive research into a multilayer capacitor array that can meet the demands for higher capacitance and greater ESR. As a result, the present inventors discovered that the ESR can be adjusted to a desired value by connecting internal electrodes to each other through an external connecting conductor disposed on the laminated body and by changing the number of lead conductors without a change in the number of laminated dielectric layers and internal electrode layers. In addition, the present inventors discovered that the ESR can be adjusted to a desired value by connecting the internal electrodes to each other through the external connecting conductor disposed on the surface of the laminated body and by changing the position of the lead conductors in the laminating direction of the laminated body. In particular, a higher ESR can be achieved by making the number of the lead conductors smaller than the number of the internal electrodes.

With reference to the research results, a multilayer capacitor array according to the present invention includes a laminated body including a plurality of laminated dielectric layers and a plurality of external conductors disposed on the laminated body. The laminated body has first and second side surfaces facing each other in a first direction perpendicular to a laminating direction of the dielectric layers, third and fourth side surfaces facing each other in a second direction perpendicular to both the laminating direction of the dielectric layers and the first direction. The laminated body includes a first internal electrode group including a plurality of first internal electrodes and a second internal electrode, and a second internal electrode group including a third internal electrode and a fourth internal electrode. The external conductors include first to fourth terminal conductors each disposed on one of the first and second side surfaces and a first external connecting conductor disposed on one of the third and fourth side surfaces. The first internal electrode group and the second internal electrode group are arranged side by side in the second direction, in the laminated body. At least one of the first internal electrodes and the second internal electrode are arranged as opposed with at least one of the dielectric layers in between, and the third and fourth internal electrodes are arranged as opposed with at least one of the dielectric layers in between. The first internal electrodes are electrically connected to the first external connecting conductor through lead conductors, the second internal electrode is electrically connected to the second terminal conductor through a lead conductor, the third internal electrode is electrically connected to the third terminal conductor through a lead conductor, and the fourth internal electrode is electrically connected to the fourth terminal conductor through a lead conductor. At least one but not all of the first internal electrodes are electrically connected to the first terminal conductor through a lead conductor.

In multilayer capacitor array according to the present invention, at least one but not all of the first internal electrodes are connected to the first terminal conductor through the lead conductor. Such a configuration can control the ESR of the capacitor formed of the first and second internal electrodes and the dielectric layer. The present invention can provide a multilayer capacitor array having controllable ESR.

In the present invention, the first external connecting conductor is disposed on the side surface (one of the first and second side surfaces), but not on the side surfaces on which the first to fourth terminal conductors are disposed. This can reduce short-circuiting between the first external connecting conductor and the first to fourth terminal conductors. The first to fourth terminal conductors disposed on the corresponding side surfaces may be disposed at a relatively large distance. This can also decrease short-circuiting between the terminal conductors.

The external conductors may further include a second external connecting conductor disposed on the side surface on which the first external connecting conductor is disposed. The first internal electrode group may include a plurality of the second internal electrodes electrically connected to the second external connecting conductor through lead conductors. At least one but not all of the second internal electrodes may be electrically connected to the second terminal conductor through a lead conductor. In this configuration, at least one but not all of the second internal electrodes are connected to the second terminal conductor through a lead conductor. Such a configuration can control the ESR of the capacitor formed of the first and second internal electrodes and the dielectric layer more effectively. Because the first and second external connecting conductors disposed on the same side surface have different polarities, generated magnetic fields are canceled by each other. Thus, the equivalent series inductance (ESL) can be reduced.

The first and second internal electrodes may be arranged as opposed with at least one of the dielectric layers in between. Such a configuration defines a capacitor formed of the first and second internal electrodes and the dielectric layers and having a relatively large electrostatic capacitance.

The first internal electrode group may be adjacent to the third side surface in the second direction, the first and second terminal conductors may be disposed on the first and second side surfaces, respectively, and the first external connecting conductor may be disposed on the third side surface at a position adjacent to the second side surface. Such a configuration ensures a relatively large length of an electric current path between the first terminal conductor and the first external connecting conductor, and thus a greater ESR of the capacitor formed of the first and second internal electrodes and the dielectric layers.

The second external connecting conductor may be disposed on the third side surface at a position adjacent to the first side surface. Such a configuration ensures a relatively large length of an electric current path between the second terminal conductor and the second external connecting conductor, and thus a much greater ESR of the capacitor formed of the first and second internal electrodes and the dielectric layers.

The external conductors may further include a third external connecting conductor. The second internal electrode group may include a plurality of the third internal electrodes. At least one of the plurality of the third internal electrodes and the fourth internal electrode may be arranged as opposed with at least one of the dielectric layers in between. The third internal electrodes may be electrically connected to the third external connecting conductor through lead conductors. At least one but not all of the third internal electrodes may be electrically connected to the third terminal conductors through a lead conductor. In this configuration, at least one but not all of the third internal electrodes are connected to the third terminal conductors through the lead conductor. Such a configuration can control the ESR of the capacitor formed of the third and fourth internal electrodes and the dielectric layer.

The external conductors may further include a fourth external connecting conductor disposed on the side surface on which the third external connecting conductor is disposed. The second internal electrode group may include a plurality of the fourth internal electrodes electrically connected to the fourth external connecting conductor through lead conductors. At least one but not all of the fourth internal electrodes may be electrically connected to the fourth terminal conductor through a lead conductor. In this configuration, at least one but not all of the fourth internal electrodes are connected to the fourth terminal conductor through the lead conductor. Such a configuration can control the ESR of the capacitor formed of the third and fourth internal electrodes and the dielectric layer more effectively. Because the third and fourth external connecting conductors disposed on the same side surface have different polarities, generated magnetic fields are canceled by each other. Thus, the ESL can be reduced.

The third and fourth internal electrodes may be arranged as opposed with at least one of the dielectric layers in between. In this configuration, the electrostatic capacitance of the capacitor formed of the third and fourth internal electrodes and the dielectric layers can be made relatively large.

The second internal electrode group may be adjacent to the fourth side surface in the second direction. The third and fourth terminal conductors may be disposed on the first and second side surfaces, respectively, and the third external connecting conductor may be disposed on the fourth side surface at a position adjacent to the second side surface. Such a configuration ensures a relatively large length of an electric current path between the third terminal conductor and the third external connecting conductor, and thus a greater ESR of the capacitor formed of the third and fourth internal electrodes and the dielectric layer.

The fourth external connecting conductor may be disposed on the fourth side surface at a position adjacent to the first side surface. Such a configuration ensures a relatively large length of an electric current path between the fourth terminal conductor and the fourth external connecting conductor, and thus a much greater ESR of the capacitor formed of the third and fourth internal electrodes and the dielectric layer.

At least one of the first and second internal electrodes and at least one of the third and fourth internal electrodes may be disposed on the same layer, and the polarities of these internal electrodes may be different from each other. This configuration generates counter current flows in the internal electrodes disposed on the same layer, which further reduces the ESL.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
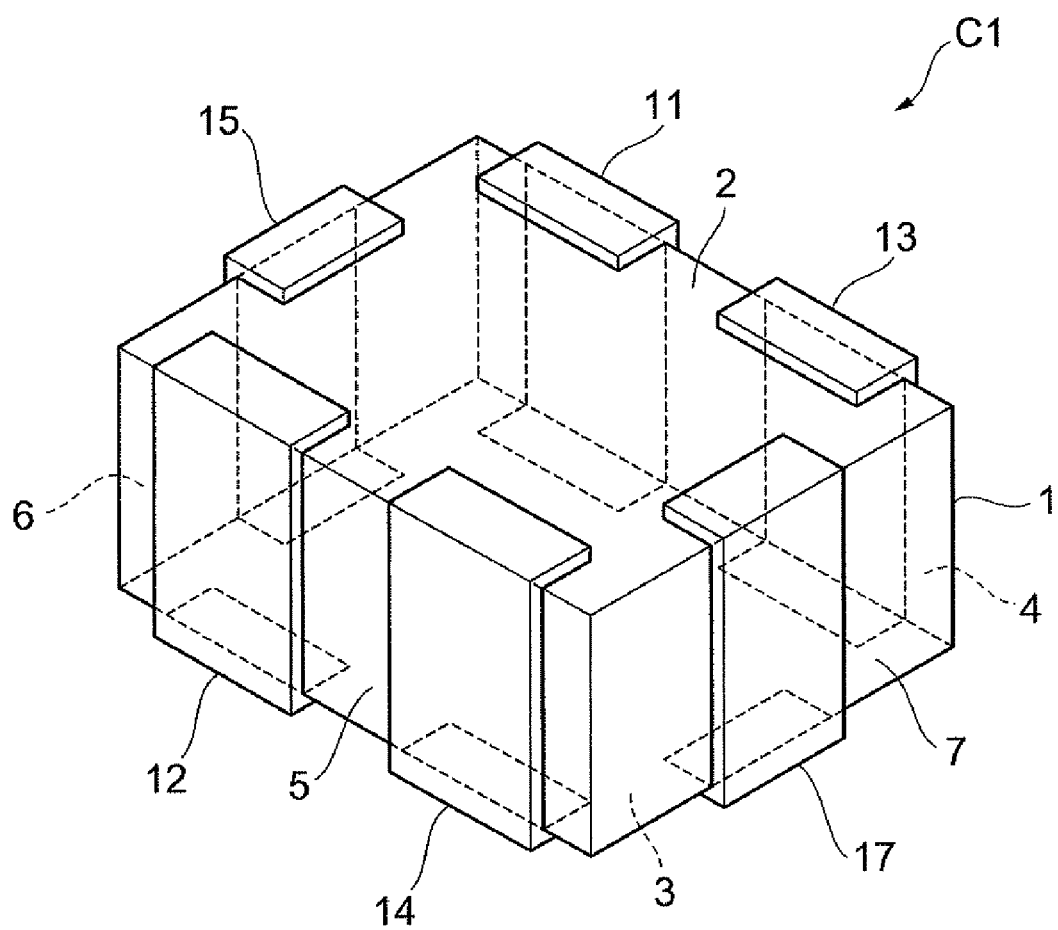
FIG. 1 is a perspective view of a multilayer capacitor array according to a first embodiment.

Preferred embodiments of the present invention are described below in detail with reference to the attached drawings. In the description, the like reference numerals are assigned to the same components or similar components having the same functions, and a detailed description thereof is omitted.

First Embodiment

Figure 2:
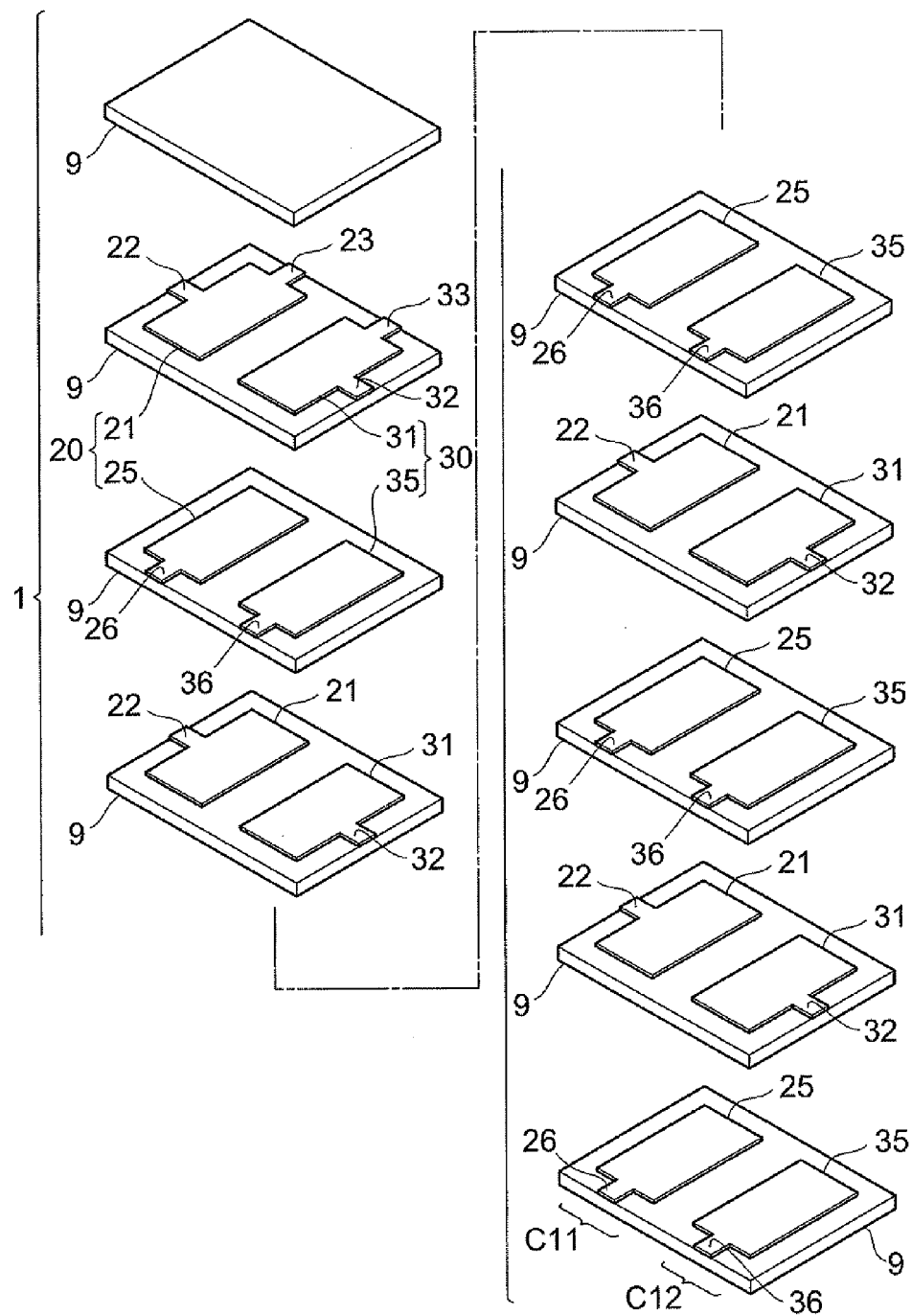
FIG. 2 is an exploded perspective view of a capacitor element assembly contained in the multilayer capacitor array according to the first embodiment.

Referring to FIGS. 1 and 2, the structure of a multilayer capacitor array C1 according to a first embodiment will be described. FIG. 1 is a perspective view of the multilayer capacitor array C1 according to the first embodiment. FIG. 2 is an exploded perspective view of a capacitor element assembly contained in the multilayer capacitor array C1 according to the first embodiment.

The multilayer capacitor array C1 according to the first embodiment includes a laminated body 1 serving as a capacitor element assembly and a plurality of external conductors 11 to 15, and 17 arranged on the outer surfaces of the laminated body 1.

The laminated body 1 is substantially a rectangular parallelepiped and has first and second rectangular main surfaces 2 and 3 facing each other, first and second side surfaces 4 and 5 facing each other, and third and fourth side surfaces 6 and 7 facing each other. The first and second side surfaces 4 and 5 extend along the long sides of the first and second main surfaces 2 and 3 such that they extend between the first and second main surfaces 2 and 3. The third and fourth side surfaces 6 and 7 extend along the short sides of the first and second main surfaces 2 and 3 between the first and second main surfaces 2 and 3. One of the first and second main surfaces 2 and 3 serves as a mounting surface at which the multilayer capacitor array C1 is mounted to another component, such as a circuit board or an electronic component.

Referring to FIG. 2, the laminated body 1 includes a plurality of dielectric layers 9 laminated in the opposed direction of the first and second main surfaces 2 and 3, and has dielectric characteristics. The dielectric layers 9 are composed of, for example, a sintered ceramic sheet containing a dielectric ceramic, such as $BaTiO_3$, $Ba(Ti, Zr)O_3$, or $(Ba, Ca)TiO_3$. In the actual multilayer capacitor array C1, the dielectric layers 9 are integrated to the extent that their boundaries cannot be identified.

The first and second main surfaces 2 and 3 face each other in the laminating direction of the dielectric layers 9. The first and second side surfaces 4 and 5 face each other in a first direction that is perpendicular to the laminating direction of the dielectric layers 9. The third and fourth side surfaces 6 and 7 face each other in a second direction perpendicular to both the laminating direction of the dielectric layers 9 and the first direction (the direction in which the first and second side surfaces 4 and 5 are disposed).

The plurality of external conductors include first to fourth terminal conductors 11 to 14 and first and third external connecting conductors 15 and 17. The first to fourth terminal conductors 11 to 14 and the first and third external connecting conductors 15 and 17 are formed by applying a conductive paste containing, for example, conductive metal powder and glass frit to the outer surfaces of the laminated body 1 and sintering it. Plating layers may be formed on the sintered conductors 11 to 15, and 17, as necessary.

The first and third terminal conductors 11 and 13 are disposed on the first side surface 4 of the laminated body 1. The first and third terminal conductors 11 and 13 extend from the first main surface 2 to the second main surface 3 so as to cover the first side surface 4 partly. The first and third terminal conductors 11 and 13 are electrically insulated from each other on the outer surfaces of the laminated body 1, and are arranged in sequence on the first side surface 4 of the laminated body 1 in the direction from the third side surface 6 to the fourth side surface 7.

The second and fourth terminal conductors 12 and 14 are disposed on the second side surface 5 of the laminated body 1. The second and fourth terminal conductors 12 and 14 extend from the first main surface 2 to the second main surface 3 so as to cover the second side surface 5 partly. The second and fourth terminal conductors 12 and 14 are electrically insulated from each other on the outer surfaces of the laminated body 1, and are arranged in sequence on the second side surface 5 of the laminated body 1 in the direction from the third side surface 6 to the fourth side surface 7.

The first external connecting conductor 15 is disposed on the third side surface 6 of the laminated body 1. The first external connecting conductor 15 extends from the first main surface 2 to the second main surface 3 so as to cover the third side surface 6 partly. The first external connecting conductor 15 is placed on the third side surface 6 in the midpoint between the first and second side surfaces 4 and 5.

The third external connecting conductor 17 is disposed on the fourth side surface 7 of the laminated body 1. The third external connecting conductor 17 extends from the first main surface 2 to the second main surface 3 so as to cover the fourth side surface 7 partly. The third external connecting conductor 17 is placed on the fourth side surface 7 in the midpoint between the first and second side surfaces 4 and 5.

Referring to FIG. 2, the laminated body 1 includes a first internal electrode group 20 and a second internal electrode group 30. The first internal electrode group 20 includes a plurality of first internal electrodes 21 and a plurality of second internal electrodes 25. The second internal electrode group 30 includes a plurality of third internal electrodes 31 and a plurality of fourth internal electrodes 35. The first to fourth internal electrodes 21, 25, 31, and 35 are disposed in the laminated body 1.

The laminated body 1 includes a region where the first internal electrode group 20 is disposed and a region where the second internal electrode group 30 is disposed. These regions are parallel to each other in the opposed direction of the third and fourth side surfaces 6, 7. In other words, the first internal electrode group 20 and the second internal electrode group 30 are disposed side by side in the laminated body 1, in the opposed direction of the third and fourth side surfaces 6, 7. More specifically, the first internal electrode group 20 is adjacent to the third side surface 6, and the second internal electrode group 30 is adjacent to the fourth side surface 7.

The first to fourth internal electrodes 21, 25, 31, and 35 are rectangular. The first to fourth internal electrodes 21, 25, 31, and 35 are made of a conductive material typically used as the internal electrodes of a monolithic electric element (for example, nickel, which is a base metal). The first to fourth internal electrodes 21 to 35 are formed of a sinter of conductive paste containing such a conductive material.

Each first internal electrode 21 and the corresponding second internal electrode 25 are arranged as opposed with one dielectric layer 9 in between.

That is, each first internal electrode 21 and the corresponding second internal electrode 25 are separated by a single dielectric layer 9. Each third internal electrode 31 and the corresponding fourth internal electrode 35 are arranged as opposed with one dielectric layer 9 in between. That is, each third internal electrode 31 and the corresponding fourth internal electrode 35 are separated by a single dielectric layer 9. The first internal electrodes 21 overlap neither the third nor fourth internal electrodes 31 and 35 at any area, when viewed in the opposed direction of the first and second main surfaces 2, 3 (the laminating direction of the dielectric layers 9). The second internal electrodes 25 overlap neither the third nor fourth internal electrodes 31 and 35 at any area, when viewed in the opposed direction of the first and second main surfaces 2, 3. Of course, the third and fourth internal electrodes 31 and 35 overlap neither the first nor second internal electrodes 21 and 25 at any area, when viewed in the opposed direction of the first and second main surfaces 2, 3.

Each first internal electrode 21 and the corresponding third internal electrode 31 are disposed on the same position (layer) in the opposed direction of the first and second main surfaces 2, 3, at a predetermined distance in the opposed direction of the third and fourth side surfaces 6, 7. The first and third internal electrodes 21 and 31 are disposed in sequence in the direction from the third side surface 6 to the fourth side surface 7.

Each second internal electrode 25 and the corresponding fourth internal electrode 35 are disposed on the same position (layer) in the opposed direction of the first and second main surfaces 2, 3, with a predetermined distance therebetween in the opposed direction of the third and fourth side surfaces 6, 7. The second and fourth internal electrodes 25 and 35 are disposed in sequence in the direction from the third side surface 6 to the fourth side surface 7.

Each first internal electrode 21 has a lead conductor 22 extending to the third side surface 6 of the laminated body 1. The lead conductor 22 is connected to the edge of the first internal electrode 21 adjacent to the third side surface 6 at one end and is exposed on the third side surface 6 at the other end. The lead conductor 22 is integrated with the first internal electrode 21.

The first external connecting conductor 15 covers the entire exposed portions of the lead conductors 22 on the third side surface 6, and the lead conductors 22 are physically and electrically connected to the first external connecting conductor 15. That is, the lead conductors 22 are directly connected to the first external connecting conductor 15. Thus, the first internal electrodes 21 are electrically connected to one another through the first external connecting conductor 15.

Among the first internal electrodes 21, at least one but not all of the first internal electrodes 21 (in this embodiment, one) have a lead conductor 23 extending to the first side surface 4 of the laminated body 1. The lead conductor 23 is connected to the edge of the first internal electrode 21 adjacent to the first side surface 4 at one end and is exposed on the first side surface 4 at the other end. The lead conductor 23 is integrated with the first internal electrode 21.

The first terminal conductor 11 covers the entire exposed portion of the lead conductor 23 on the first side surface 4, and the lead conductor 23 is physically and electrically connected to the first terminal conductor 11. That is, the lead conductor 23 is directly connected to the first terminal conductor 11. Since the first internal electrodes 21 are electrically connected to one another through the first external connecting conductor 15, all the first internal electrodes 21 are electrically connected to the first terminal conductor 1. This provides a parallel connection of the first internal electrodes 21.

Each second internal electrode 25 has a lead conductor 26 extending to the second side surface 5 of the laminated body 1. The lead conductor 26 is connected to the edge of the second internal electrode 25 adjacent to the second side surface 5 at one end and is exposed on the second side surface 5 at the other end. The lead conductor 26 is integrated with the second internal electrode 25.

The second terminal conductor 12 covers the entire exposed portions of the lead conductors 26 on the second side surface 5, and the lead conductors 26 are physically and electrically connected to the second terminal conductor 12. That is, the lead conductors 26 are directly connected to the second terminal conductor 12. Thus, the second internal electrodes 25 are electrically connected to one another through the second terminal conductor 12.

Each third internal electrode 31 has a lead conductor 32 extending to the fourth side surface 7 of the laminated body 1. The lead conductor 32 is connected to the edge of the third internal electrode 31 adjacent to the fourth side surface 7 at one end and is exposed on the fourth side surface 7 at the other end. The lead conductor 32 is integrated with the third internal electrode 31.

The third external connecting conductor 17 covers the entire exposed portions of the lead conductors 32 on the fourth side surface 7, and the lead conductors 32 are physically and electrically connected to the third external connecting conductor 17. That is, the lead conductors 32 are directly connected to the third external connecting conductor 17. Thus, the third internal electrodes 31 are electrically connected to one another through the third external connecting conductor 17.

Among the third internal electrodes 31, at least one but not all of the third internal electrodes 31 (in this embodiment, one) have a lead conductor 33 extending to the first side surface 4 of the laminated body 1. The lead conductor 33 is connected to the edge of the third internal electrode 31 adjacent to the first side surface 4 at one end and is exposed on the first side surface 4 at the other end. The lead conductor 33 is integrated with the third internal electrode 31.

The third terminal conductor 13 covers the entire exposed portion of the lead conductor 33 on the first side surface 4, and the lead conductor 33 is physically and electrically connected to the third terminal conductor 13. That is, the lead conductor 33 is directly connected to the third terminal conductor 13. Since the third internal electrodes 31 are electrically connected to one another through the third external connecting conductor 17, all the third internal electrodes 31 are electrically connected to the third terminal conductor 13. This provides a parallel connection of the third internal electrodes 31.

Each fourth internal electrode 35 has a lead conductor 36 extending to the second side surface 5 of the laminated body 1. The lead conductor 36 is connected to the edge of the fourth internal electrode 35 adjacent to the second side surface 5 at one end and is exposed on the second side surface 5 at the other end. The lead conductor 36 is integrated with the fourth internal electrode 35.

The fourth terminal conductor 14 covers the entire exposed portions of the lead conductors 36 on the second side surface 5, and the lead conductors 36 are physically and electrically connected to the fourth terminal conductor 14. That is, the lead conductors 36 are directly connected to the fourth terminal conductor 14. Thus, the fourth internal electrodes 35 are electrically connected to one another through the fourth terminal conductor 14.

Thus, in the multilayer capacitor array C1, the first and second internal electrodes 21 and 25 and the dielectric layers 9, each of the dielectric layers 9 being disposed between the first and second internal electrodes 21 and 25, form a first capacitor C11. In the multilayer capacitor array C1, the third and fourth internal electrodes 31 and 35 and the dielectric layers 9, each of the dielectric layers 9 being disposed between the third and fourth internal electrodes 31 and 35, form a second capacitor C12.

In the first capacitor C11 of the multilayer capacitor array C1, one of the first internal electrodes 21 is directly connected to the first terminal conductor 11 through the lead conductor 23, which is less than the total number of the first internal electrodes 21 (four in this embodiment). That is, some first internal electrodes 21 are not directly connected to the first terminal conductor 11 but are indirectly connected to the first terminal conductor 11. When attention is focused on the first terminal conductor 11, a resistance component of the first external connecting conductor 15 is connected in series to the first terminal conductor 11. Thus, the ESR of the first capacitor C11 is greater than that of a conventional capacitor contained in a multilayer capacitor array in which all internal electrodes are connected to the respective terminal conductors through lead conductors. An increase in the ESR prevents a sharp drop of the impedance at the resonance frequency and provides a wider bandwidth.

In the second capacitor C12 of the multilayer capacitor array C1, one of the third internal electrodes 31 is directly connected to the third terminal conductor 13 through the lead conductor 33, which is less than the total number of the third internal electrodes 31 (four in this embodiment). That is, some third internal electrodes 31 are not directly connected to the third terminal conductor 13 but are indirectly connected to the third terminal conductor 13. When attention is focused on the third terminal conductor 13, a resistance component of the third external connecting conductor 17 is connected in series to the third terminal conductor 13. Thus, the ESR of the second capacitor C12 is greater than that of a conventional capacitor contained in a multilayer capacitor array in which all internal electrodes are connected to the respective terminal conductors through lead conductors. An increase in the ESR prevents a sharp drop of the impedance at the resonance frequency and provides a wider bandwidth.

Thus, the first and second capacitors C11 and C12 contained in the multilayer capacitor array C1 can have ESR greater than that of a conventional capacitor in which all internal electrodes are connected to the respective terminal conductors through lead conductors.

As has been described, the multilayer capacitor array C1 has controllable ESR.

In the first capacitor C11, the ESR can be set to a desired value by adjusting the number of the first internal electrodes 21 electrically connected to the first terminal conductor 11 through the lead conductor 23. In the second capacitor C12, the ESR can be set to a desired value by adjusting the number of the third internal electrodes 31 electrically connected to the third terminal conductor 13 through the lead conductor 33. Accordingly in the multilayer capacitor array C1, the ESR can be controlled with ease and accuracy.

In the first capacitor C11, the ESR can be set to a desired value by adjusting the position, in the laminating direction of the laminated body 1, of the first internal electrodes 21 electrically connected to the first terminal conductor 11 through the lead conductor 23. In the second capacitor C12, the ESR can be set to a desired value by adjusting the position, in the laminating direction of the laminated body 1, of the third internal electrodes 31 electrically connected to the third terminal conductor 13 through the lead conductor 33.

In the multilayer capacitor array C1, the first and third external connecting conductors 15 and 17 are disposed on the side surfaces 6 and 7, respectively, but not on the side surfaces 4 and 5 where the first to fourth terminal conductors 11 to 14 are disposed. This can reduce short-circuiting between the first to fourth terminal conductors 11 to 14 and the first and third external connecting conductors 15 and 17. The first and third terminal conductors 11 and 13 and the second and fourth terminal conductors 12 and 14 disposed on the side surfaces 4 and 5, respectively, may be disposed at a relatively large distance. This can also decrease short-circuiting between the terminal conductors 11 to 14.

In the multilayer capacitor array C1, Each first internal electrode 21 and the corresponding second internal electrode 25 are arranged as opposed with one dielectric layer 9 in between. Thus, the electrostatic capacitance of the first capacitor C11 formed of the first and second internal electrodes 21 and 25 and the dielectric layers 9 can be made relatively large. Each third internal electrode 31 and the corresponding fourth internal electrode 35 are arranged as opposed with one dielectric layer 9 in between. Thus, the electrostatic capacitance of the second capacitor C12 formed of the third and fourth internal electrodes 31 and 35 and the dielectric layers 9 can be made relatively large. Accordingly, it is possible to control the capacitors C11 and C12 in the multilayer capacitor array C1 to have greater ESR and a larger electrostatic capacitance.

Second Embodiment

Figure 3:
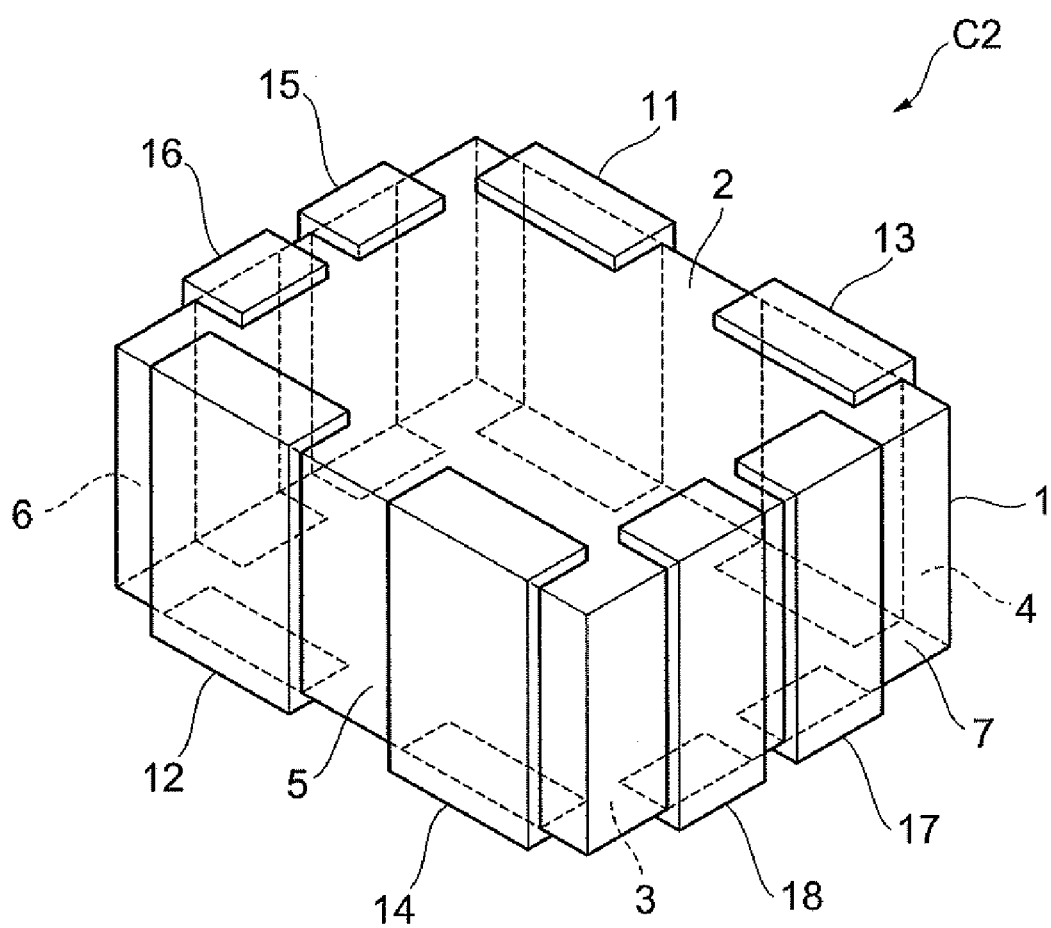
FIG. 3 is a perspective view of a multilayer capacitor array according to a second embodiment.
Figure 4:
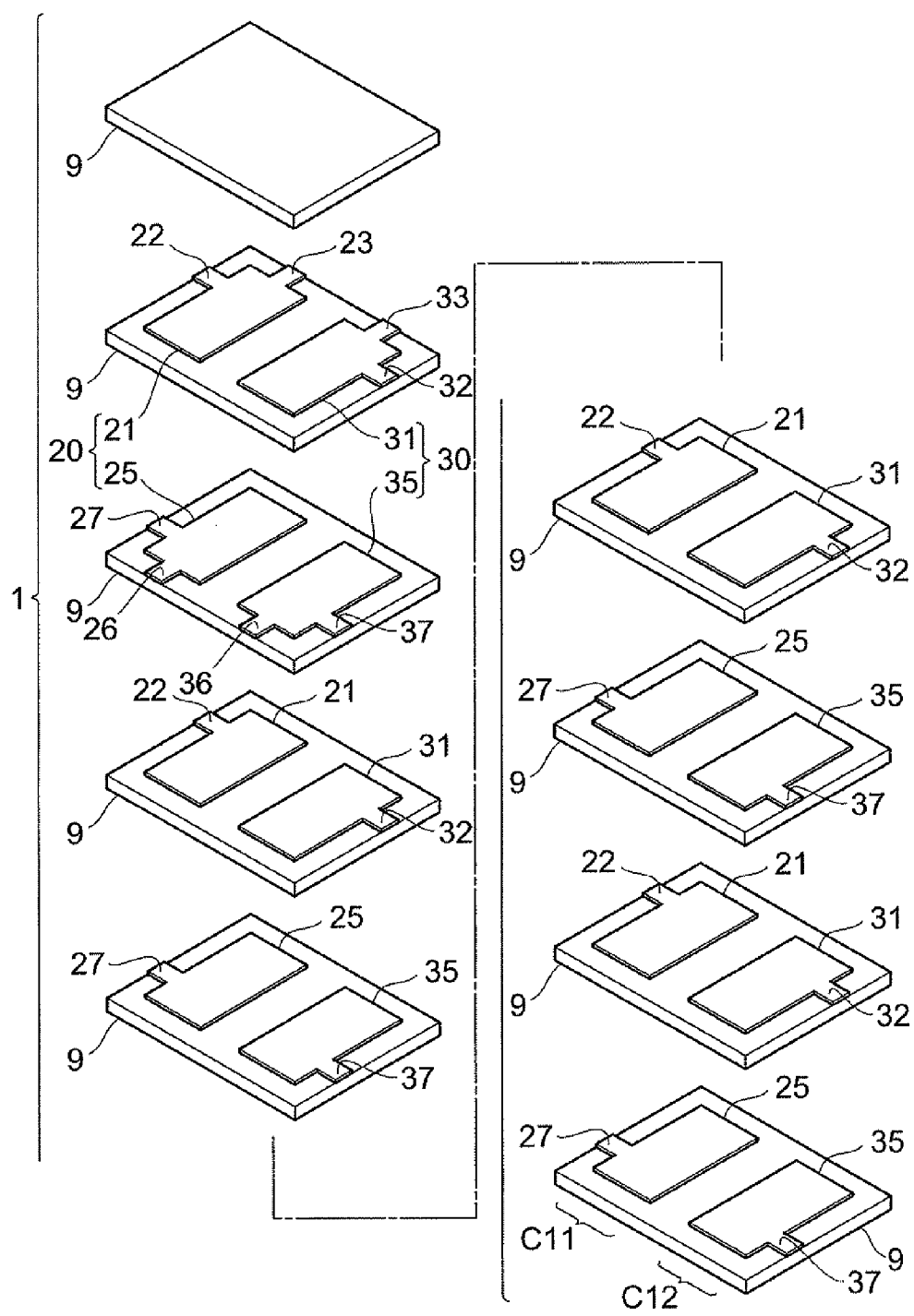
FIG. 4 is an exploded perspective view of a capacitor element assembly contained in the multilayer capacitor array according to the second embodiment.

Referring to FIGS. 3 and 4, the structure of a multilayer capacitor array C2 according to a second embodiment will be described. The multilayer capacitor array C2 according to the second embodiment is different from the multilayer capacitor array C1 according to the first embodiment in the number of external conductors, in particular, external connecting conductors. FIG. 3 is a perspective view of the multilayer capacitor array C2 according to the second embodiment. FIG. 4 is an exploded perspective view of a capacitor element assembly contained in the multilayer capacitor array C2 according to the second embodiment.

The multilayer capacitor array C2 according to the second embodiment includes a laminated body 1 serving as the capacitor element assembly and a plurality of external conductors 11 to 18 disposed on the outer surfaces of the laminated body 1.

The external conductors include the first to fourth terminal conductors 11 to 14 and the first to fourth external connecting conductors 15 to 18. The second and fourth external connecting conductors 16 and 18 are formed by applying a conductive paste containing, for example, conductive metal powder and glass frit to the outer surfaces of the laminated body 1 and sintering it, as in the first to fourth terminal conductors 11 to 14 and the first and third external connecting conductors 15 and 17. Plating layers may be formed on the sintered conductors 16 and 18, as necessary.

The second external connecting conductor 16 is disposed on a third side surface 6 of the laminated body 1. The second external connecting conductor 16 extends from a first main surface 2 to a second main surface 3 so as to cover the third side surface 6 partly. The first and second external connecting conductors 15 and 16 are electrically insulated from each other on the outer surfaces of the laminated body 1, and are arranged on the third side surface 6 of the laminated body 1 in sequence in the direction from a first side surface 4 to a second side surface 5. Thus, the first external connecting conductor 15 is disposed on the third side surface 6 adjacent to the first side surface 4, and the second external connecting conductor 16 is disposed on the third side surface 6 adjacent to the second side surface 5.

The fourth external connecting conductor 18 is disposed on a fourth side surface 7 of the laminated body 1. The fourth external connecting conductor 18 extends from the first main surface 2 to the second main surface 3 so as to cover the fourth side surface 7 partly. The third and fourth external connecting conductors 17 and 18 are electrically insulated from each other on the outer surfaces of the laminated body 1, and are arranged on the fourth side surface 7 of the laminated body 1 in sequence in the direction from the first side surface 4 to the second side surface 5. Thus, the third external connecting conductor 17 is disposed on the fourth side surface 7 adjacent to the first side surface 4, and the fourth external connecting conductor 18 is disposed on the fourth side surface 7 adjacent to the second side surface 5.

Each second internal electrode 25 has a lead conductor 27 extending to the third side surface 6 of the laminated body 1. The lead conductor 27 is connected to the edge of the second internal electrode 25 adjacent to the third side surface 6 at one end and is exposed on the third side surface 6 at the other end. The lead conductor 27 is integrated with the second internal electrode 25.

The second external connecting conductor 16 covers the entire exposed portions of the lead conductors 27 on the third side surface 6, and the lead conductors 27 are physically and electrically connected to the second external connecting conductor 16. That is, the lead conductors 27 are directly connected to the second external connecting conductor 16. Thus, the second internal electrodes 25 are electrically connected to one another through the second external connecting conductor 16.

Among the second internal electrodes 25, at least one but not all of the second internal electrodes 25 (in this embodiment, one) have a lead conductor 26. Since the second internal electrodes 25 are electrically connected to one another through the second external connecting conductor 16, all the second internal electrodes 25 are electrically connected to the second terminal conductor 12. This provides a parallel connection of the second internal electrodes 25.

Each fourth internal electrode 35 has a lead conductor 37 extending to the fourth side surface 7 of the laminated body 1. The lead conductor 37 is connected to the edge of the fourth internal electrode 35 adjacent to the fourth side surface 7 at one end, and is exposed on the fourth side surface 7 at the other end. The lead conductor 37 is integrated with the fourth internal electrode 35.

The fourth external connecting conductor 18 covers the entire exposed portions of the lead conductors 37 on the fourth side surface 7, and the lead conductors 37 are physically and electrically connected to the fourth external connecting conductor 18. That is, the lead conductors 37 are directly connected to the fourth external connecting conductor 18. Thus, the fourth internal electrodes 35 are electrically connected to one another through the fourth external connecting conductor 18.

Among the fourth internal electrodes 35, at least one but not all of the fourth internal electrodes 35 (in this embodiment, one) have a lead conductor 36. Since the fourth internal electrodes 35 are electrically connected to one another through the fourth external connecting conductor 18, all the fourth internal electrodes 35 are electrically connected to the fourth terminal conductor 14. This provides a parallel connection of the fourth internal electrodes 35.

Thus, in the multilayer capacitor array C2, first and second capacitors C11 and C12 are formed, as in the multilayer capacitor array C1.

In addition, in the first capacitor C11 of the multilayer capacitor array C2, one of the second internal electrodes 25 is directly connected to the second terminal conductor 12 through the lead conductors 27, which is less than the total number of the second internal electrodes 25 (four in this embodiment). That is, some second internal electrodes 25 are not directly connected to the second terminal conductor 12 but are indirectly connected to the second terminal conductor 12. When attention is focused on the second terminal conductor 12, a resistance component of the second external connecting conductor 16 is connected in series to the second terminal conductor 12. Thus, the ESR of the first capacitor C11 is much greater than that of a conventional capacitor contained in a multilayer capacitor array in which all internal electrodes are connected to the respective terminal conductors through lead conductors. A further increase in the ESR prevents a sharp drop of the impedance at the resonance frequency and provides a much wider bandwidth.

In addition, in the second capacitor C12 of the multilayer capacitor array C2, one of the fourth internal electrodes 35 is directly connected to the fourth terminal conductor 14 through the lead conductors 37, which is less than the total number of the fourth internal electrodes 35 (four in this embodiment). That is, some fourth internal electrodes 35 are not directly connected to the fourth terminal conductor 14, but are indirectly connected to the fourth terminal conductor 14. When attention is focused on the fourth terminal conductor 14, a resistance component of the fourth external connecting conductor 18 is connected in series to the fourth terminal conductor 14. Thus, the ESR of the second capacitor C12 is much greater than that of a conventional capacitor contained in a multilayer capacitor array in which all internal electrodes are connected to the respective terminal conductors through lead conductors. A further increase in the ESR prevents a sharp drop of the impedance at the resonance frequency and provides a much wider bandwidth.

Thus, the ESR of the first and second capacitors C11 and C12 contained in the multilayer capacitor array C2 can be made much greater than that of a conventional capacitor in which all internal electrodes are connected to the respective terminal conductors through lead conductors.

As has been described, the multilayer capacitor array C2 has more controllable ESR.

In the first capacitor C11, the ESR can be set to a desired value by adjusting the number of the second internal electrodes 25 electrically connected to the second terminal conductor 12 through the lead conductors 27. In the second capacitor C12, the ESR can be set to a desired value by adjusting the number of the fourth internal electrodes 35 electrically connected to the fourth terminal conductor 14 through the lead conductors 37. Accordingly, in the multilayer capacitor array C1, the ESR can be controlled with greater ease and accuracy.

In the first capacitor C11, the ESR can be set to a desired value by adjusting the position, in the laminating direction of the laminated body 1, of the second internal electrodes 25 electrically connected to the second terminal conductor 12 through the lead conductors 27. In the second capacitor C12, the ESR can be set to a desired value by adjusting the position, in the laminating direction of the laminated body 1, of the fourth internal electrodes 35 electrically connected to the fourth terminal conductor 14 through the lead conductors 37.

In the multilayer capacitor array C2, like the multilayer capacitor array C1, short-circuiting can be suppressed between the first to fourth terminal conductors 11 to 14 and the first to fourth external connecting conductors 15 to 18, as well between the terminal conductors 11 to 14. Because only the first and second external connecting conductors 15 and 16 and the third and fourth external connecting conductors 17 and 18 are disposed on the side surfaces 6 and 7, respectively, the first and second external connecting conductors 15 and 16 and the third and fourth external connecting conductors 17 and 18 may be disposed at a relatively large distance. Therefore, short-circuiting can also be suppressed between the external connecting conductors 15 to 18.

In the multilayer capacitor array C2, because the first external connecting conductor 15 and the second external connecting conductor 16 disposed on the same side surface 6 have different polarities, generated magnetic fields are canceled by each other. Thus, the ESL can be reduced. Because the third external connecting conductor 17 and the fourth external connecting conductor 18, disposed on the same side surface 7, also have different polarities, generated magnetic fields are canceled by each other. Thus, the ESL can be reduced.

Third Embodiment

Figure 5:
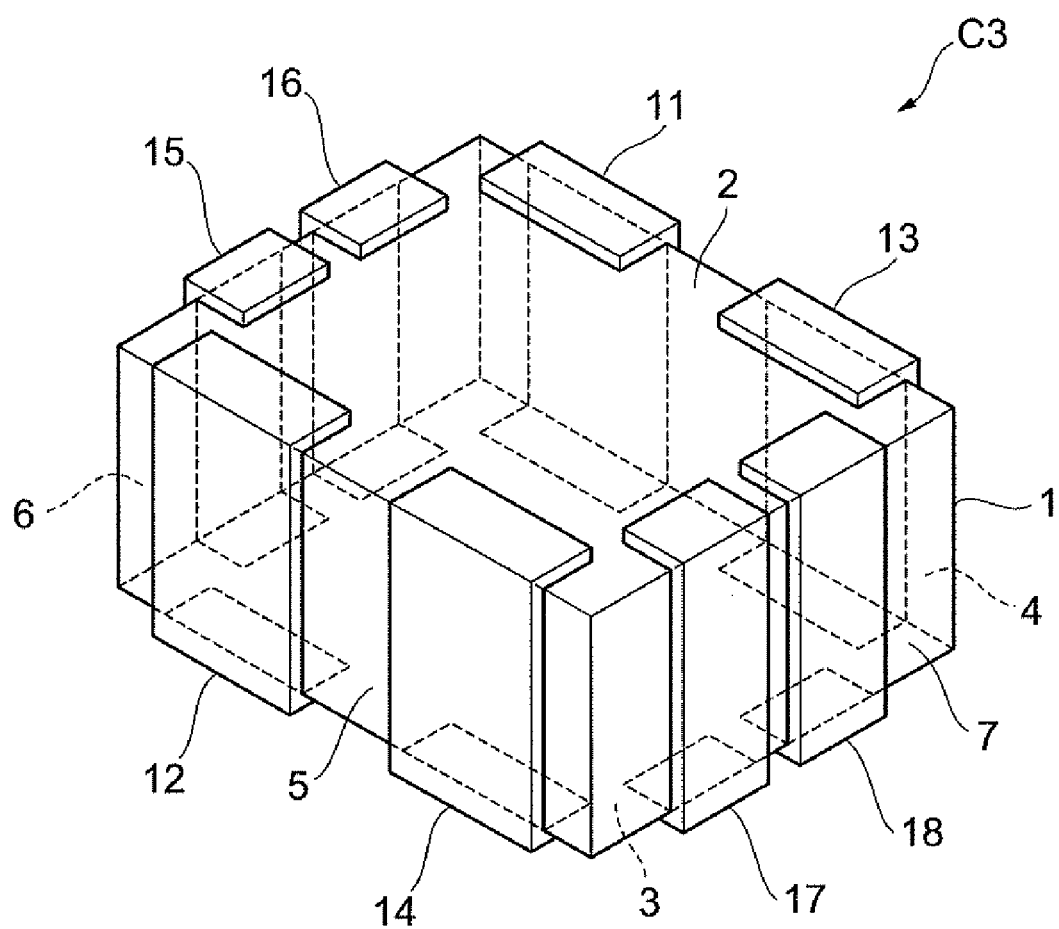
FIG. 5 is a perspective view of a multilayer capacitor array according to a third embodiment.
Figure 6:
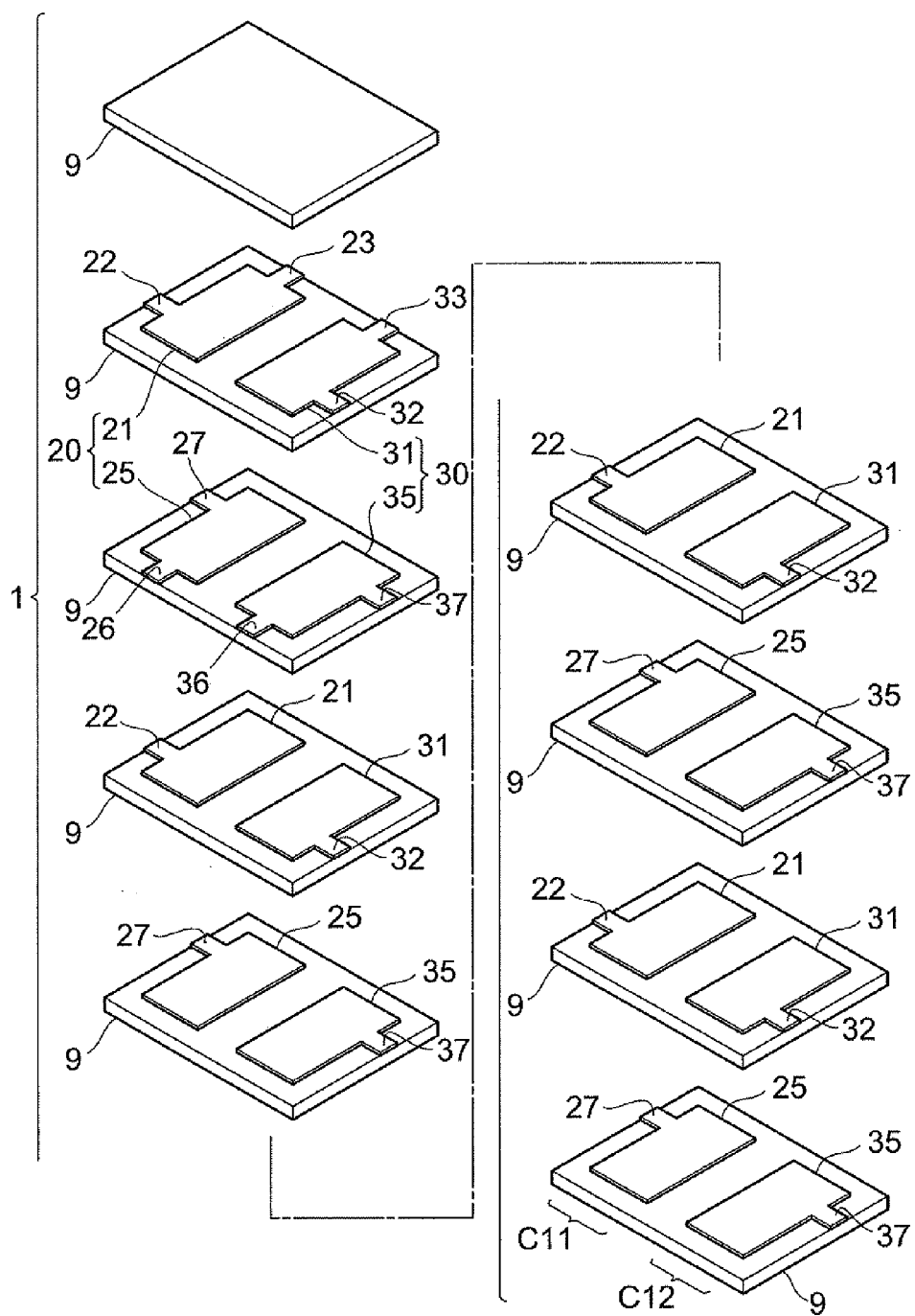
FIG. 6 is an exploded perspective view of a capacitor element assembly contained in the multilayer capacitor array according to the third embodiment.

Referring to FIGS. 5 and 6, the structure of a multilayer capacitor array C3 according to a third embodiment will be described. The multilayer capacitor array C3 according to the third embodiment is different from the multilayer capacitor array C2 according to the second embodiment in the arrangement of the external connecting conductor. FIG. 5 is a perspective view of the multilayer capacitor array C3 according to the third embodiment. FIG. 6 is an exploded perspective view of a capacitor element assembly contained in the multilayer capacitor array C3 according to the third embodiment.

The multilayer capacitor array C3 according to the third embodiment includes a laminated body 1 serving as a capacitor element assembly and a plurality of external conductors 11 to 18 arranged on the outer surfaces of the laminated body 1.

The first and second external connecting conductors 15 and 16 are disposed on a third side surface 6 of the laminated body 1 in sequence in the direction from the second side surface 5 to the first side surface 4. The first external connecting conductor 15 is disposed on the third side surface 6 adjacent to the second side surface 5, and the second external connecting conductor 16 is disposed on the third side surface 6 adjacent to the first side surface 4.

The third and fourth external connecting conductors 17 and 18 are disposed on the fourth side surface 7 of the laminated body 1 in sequence in the direction from the second side surface 5 to the first side surface 4. The third external connecting conductor 17 is disposed on the fourth side surface 7 adjacent to the second side surface 5, and the fourth external connecting conductor 18 is disposed on the fourth side surface 7 adjacent to the first side surface 4.

In the multilayer capacitor array C3, first and second capacitors C11 and C12 are formed and the ESR can be controlled more effectively, like the multilayer capacitor array C2.

In the multilayer capacitor array C3, the first external connecting conductor 15 is disposed on the third side surface 6 adjacent to the second side surface 5. Such a configuration ensures a relatively large length of an electric current path between the first terminal conductor 11 and the first external connecting conductor 15. In addition, the second external connecting conductor 16 is disposed on the third side surface 6 adjacent to the first side surface 4. Such a configuration ensures a relatively large length of an electric current path between the second terminal conductor 12 and the second external connecting conductor 16. These further increase the ESR of the capacitor C11.

In the multilayer capacitor array C3, the third external connecting conductor 17 is disposed on the fourth side surface 7 adjacent to the second side surface 5. Such a configuration ensures a relatively large length of an electric current path between the third terminal conductor 13 and the third external connecting conductor 17. In addition, the fourth external connecting conductor 18 is disposed on the fourth side surface 7 adjacent to the first side surface 4. Such a configuration ensures a relatively large length of an electric current path between the fourth terminal conductor 14 and the fourth external connecting conductor 18. These also further increase the ESR of the capacitor C12.

Although the preferable embodiments of the present invention have been described, the present invention is not limited to the above-described embodiments.

The number of the capacitors in the multilayer capacitor array is not limited to that described in the embodiments and, for example, three or more capacitors may be provided. The numbers of the laminated dielectric layers 9 and the first to fourth internal electrodes 21 to 35 are not limited to that described in the embodiments. The laminated body may have, for example, two or more first internal electrodes 21, two or more third internal electrodes 31, one or more second internal electrodes 25, and one or more fourth internal electrodes 35.

At least one of the first internal electrodes 21 and at least one of the second internal electrodes 25 may be arranged as opposed with at least one of the dielectric layers in between. At least one of the third internal electrodes 31 and at least one of the fourth internal electrodes 35 may be arranged as opposed with at least one of the dielectric layers in between.

The first and third internal electrodes 21 and 31 need not be disposed on the same layer The second and fourth internal electrodes 25 and 35 need not be disposed on the same layer. The first to fourth internal electrodes 21 to 35 need not have the shape as described in the embodiments as long as they are electrically connected to the respective external conductors.

The number of the first to fourth terminal conductors 11 to 14 does not need to be as described in the embodiments. The number of the first to fourth external connecting conductors 15 to 18 does not need to be as described in the embodiments. Furthermore, the numbers of the first to fourth terminal conductors 11 to 14 may differ from each other, while the numbers of the first to fourth external connecting conductors 15 to 18 may differ from each other.

The number and position, in the laminating direction, of the internal electrodes directly connected to the terminal conductors 11 to 14 through the lead conductors need not be those described in the embodiments.

It is not necessary for more than one capacitor in a multilayer capacitor array has controllable ESR, and at least one capacitor in the multilayer capacitor array needs to have controllable ESR. The capacitors contained in the multilayer capacitor array may have a different number of laminated internal electrodes.

In a mounted structure of the multilayer capacitor arrays C1 to C3, if the first and third terminal conductors 11 and 13 have opposite polarities, the first and third internal electrodes 21 and 31 on the same layer have different polarities. Similarly, if the second and fourth terminal conductors 12 and 14 have opposite polarities, the second and fourth internal electrodes 25 and 35 on the same layer have different polarities. This generates counter current flows in the first and third internal electrodes 21 and 31 and in the second and fourth internal electrodes 25 and 35, which further reduces the ESL.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array comprising:
a laminated body including a plurality of laminated dielectric layers; and
a plurality of external conductors disposed on the laminated body,
wherein the laminated body has first and second side surfaces facing each other in a first direction perpendicular to a laminating direction of the dielectric layers, third and fourth side surfaces facing each other in a second direction perpendicular to both the laminating direction of the dielectric layers and the first direction, and the laminated body includes a first internal electrode group including a plurality of first internal electrodes and a second internal electrode, and a second internal electrode group including a third internal electrode and a fourth internal electrode,
wherein the external conductors include first to fourth terminal conductors each disposed on one of the first and second side surfaces and a first external connecting conductor disposed on one of the third and fourth side surfaces,
wherein the first internal electrode group and the second internal electrode group are arranged side by side in the second direction, in the laminated body,
wherein at least one of the first internal electrodes and the second internal electrode are arranged as opposed with at least one of the dielectric layers in between,
wherein the third and fourth internal electrodes are arranged as opposed with at least one of the dielectric layers in between,
wherein the first internal electrodes are electrically connected to the first external connecting conductor through lead conductors,
wherein the second internal electrode is electrically connected to the second terminal conductor through a lead conductor,
wherein the third internal electrode is electrically connected to the third terminal conductor through a lead conductor,
wherein the fourth internal electrode is electrically connected to the fourth terminal conductor through a lead conductor, and
wherein at least one but not all of the first internal electrodes are electrically connected to the first terminal conductor through a lead conductor.

2. The multilayer capacitor array according to claim 1,
wherein the external conductors further include a second external connecting conductor disposed on the side surface on which the first external connecting conductor is disposed,
wherein the first internal electrode group includes a plurality of the second internal electrodes electrically connected to the second external connecting conductor through lead conductors, and
wherein at least one but not all of the second internal electrodes are electrically connected to the second terminal conductor through a lead conductor.

3. The multilayer capacitor array according to claim 2,
wherein the first and second internal electrodes are arranged as opposed with at least one of the dielectric layers in between.

4. The multilayer capacitor array according to claim 1,
wherein the first internal electrode group is adjacent to the third side surface in the second direction,
wherein the first and second terminal conductors are disposed on the first and second side surfaces, respectively, and
wherein the first external connecting conductor is disposed on the third side surface at a position adjacent to the second side surface.

5. The multilayer capacitor array according to claim 4,
wherein the second external connecting conductor is disposed on the third side surface at a position adjacent to the first side surface.

6. The multilayer capacitor array according to claim 1,
wherein the external conductors further include a third external connecting conductor,
wherein the second internal electrode group includes a plurality of the third internal electrodes, at least one of the plurality of the third internal electrodes and the fourth internal electrode being arranged as opposed with at least one of the dielectric layers in between,
wherein the third internal electrodes are electrically connected to the third external connecting conductor through lead conductors, and
wherein at least one but not all of the third internal electrodes are electrically connected to the third terminal conductors through a lead conductor.

7. The multilayer capacitor array according to claim 6,
wherein the external conductors further include a fourth external connecting conductor disposed on the side surface on which the third external connecting conductor is disposed,
wherein the second internal electrode group includes a plurality of the fourth internal electrodes electrically connected to the fourth external connecting conductor through lead conductors, and
wherein at least one but not all of the fourth internal electrodes are electrically connected to the fourth terminal conductor through a lead conductor.

8. The multilayer capacitor array according to claim 7,
wherein the third and fourth internal electrodes are arranged as opposed with at least one of the dielectric layers in between.

9. The multilayer capacitor array according to claim 6,
wherein the second internal electrode group is adjacent to the fourth side surface in the second direction,
wherein the third and fourth terminal conductors are disposed on the first and second side surfaces, respectively, and
wherein the third external connecting conductor is disposed on the fourth side surface at a position adjacent to the second side surface.

10. The multilayer capacitor array according to claim 9,
wherein the fourth external connecting conductor is disposed on the fourth side surface at a position adjacent to the first side surface.

11. The multilayer capacitor array according to claim 1,
wherein at least one of the first and second internal electrodes and at least one of the third and fourth internal electrodes are disposed on the same layer, and
wherein the polarities of these internal electrodes are different from each other.

* * * * *